US012795660B2

(12) United States Patent
Liang et al.

(10) Patent No.: US 12,795,660 B2
(45) Date of Patent: Nov. 10, 2026

(54) METHOD, DEVICE AND COMPUTER READABLE MEDIUM FOR COMMUNICATION

(71) Applicant: NEC CORPORATION, Tokyo (JP)

(72) Inventors: Lin Liang, Beijing (CN); Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 18/577,085

(22) PCT Filed: Jul. 8, 2021

(86) PCT No.: PCT/CN2021/105272
§ 371 (c)(1),
(2) Date: Jan. 5, 2024

(87) PCT Pub. No.: WO2023/279332
PCT Pub. Date: Jan. 12, 2023

(65) Prior Publication Data

US 2024/0365309 A1 Oct. 31, 2024

(51) Int. Cl.
*H04W 72/1268* (2023.01)
*H04W 72/23* (2023.01)
*H04W 72/542* (2023.01)

(52) U.S. Cl.
CPC ....... *H04W 72/1268* (2013.01); *H04W 72/23* (2023.01); *H04W 72/542* (2023.01)

(58) Field of Classification Search
CPC ........... H04W 72/1268; H04W 72/542; H04W 72/23
See application file for complete search history.

(56) References Cited

U.S. PATENT DOCUMENTS 12,363,723 B2 * 7/2025 Takeda .................. H04L 5/0055
12,520,347 B2 * 1/2026 Turtinen ........... H04W 74/0833

FOREIGN PATENT DOCUMENTS

CN 111246590 A 6/2020
WO 2021/133705 A1 7/2021

OTHER PUBLICATIONS

U.S. Appl. No. 63/086,281, filed Oct. 1, 2020, Park et al.*
Samsung, "RACH configuration for Small Data Transmission", 3GPP TSG-RAN2 Meeting #112 Electronic, R2-2009097, 2020, 6 pages.

(Continued)

*Primary Examiner* — Wayne H Cai
(74) *Attorney, Agent, or Firm* — Sughrue Mion, PLLC

(57) ABSTRACT

Embodiments of the present disclosure relate to methods, devices and computer readable media for communication. According to embodiments of the present disclosure, a terminal device receives, from a network device, a configuration indicating a configured grant (CG) physical uplink shared channel (PUSCH) resource and a search space which is specific to the terminal device. The terminal device transmits, to the network device, data using the CG PUSCH resource. The terminal device monitors a physical downlink control channel (PDCCH) on the search space using a reference signal which is quasi-collocated (QCL) with a beam on which the data is transmitted using the CG PUSCH resource. In this way, it can achieve better link performances.

5 Claims, 10 Drawing Sheets

(56) References Cited

OTHER PUBLICATIONS

Sony, “CG-based SDT in NR”, 3GPP TSG-RAN WG2 Meeting #114 electronic, R2-2105694, 2021, 4 pages.
Samsung, “Configured Grant based Small Data Transmission”, 3GPP TSG-RAN2 Meeting #112 Electronic, R2-2009094, 2020, 8 pages.
Qualcomm Incorporated, “Discussion on open issues for CG based SDT”, 3GPP TSG-RAN WG2 Meeting #114 electronic, R2-2105887, Revision of R2-2103434, 2021, 5 pages.
Qualcomm Incorporated, “Discussion on CG based NR small data transmission”, 3GPP TSG-RAN WG2 Meeting #113 bis electronic, R2-2103434, Revision of R2-2101233, 2021, 6 pages.
International Search Report of PCT/CN2021/105272 dated Mar. 28, 2022 [PCT/ISA/210].
Written Opinion of PCT/CN2021/105272 dated Mar. 28, 2022 [PCT/ISA/237].

* cited by examiner

METHOD, DEVICE AND COMPUTER READABLE MEDIUM FOR COMMUNICATION

TECHNICAL FIELD

Embodiments of the present disclosure generally relate to the field of telecommunication, and in particular, to methods, devices and computer storage media for communication.

BACKGROUND

With developments of communication systems, new technologies have been proposed. For example, to increase the utilization ratio of periodically allocated resources, the communication system may enable multiple devices to share the periodic resources allocated with a configured grant (CG) mechanism. The base station allocates the configured grant resources to multiple terminal devices, and the terminal devices utilize the resources when they have data to transmit. By assigning the configured grant resources, the communication system eliminates the packet transmission delay due to a scheduling request procedure.

SUMMARY

In general, embodiments of the present disclosure provide methods, devices and computer storage media for communication.

In a first aspect, there is provided a method of communication. The method comprises: receiving, at a terminal device and from a network device, a configuration indicating a configured grant (CG) physical uplink shared channel (PUSCH) resource and a search space which is specific to the terminal device; transmitting, to the network device, data using the CG PUSCH resource in an inactive state; and monitoring, at the terminal device, a physical downlink control channel (PDCCH) on the search space using a reference signal which is quasi-collocated (QCL) with a beam which is used for transmitting the data using the CG PUSCH resource in the inactive state.

In a second aspect, there is provided a method of communication. The method comprises: receiving, at a terminal device and from a network device, a configuration indicating a configured grant (CG) physical uplink shared channel (PUSCH) resource and a search space which is specific to the terminal device; receiving, from the network device, a configuration of a timer; and during the timer being running, monitoring, at the terminal device, a physical downlink control channel (PDCCH) on the search space for a dynamic retransmission indication of the CG PUSCH.

In a third aspect, there is provided a method of communication. The method comprises: receiving, at a terminal device and from a network device, a number of preambles for data transmission in a radio resource control (RRC) inactive state; receiving an offset from the network device; and performing the data transmission using a start index of preamble which is determined based on the offset.

In a fourth aspect, there is provided a method of communication. The method comprises: transmitting, at a network device and to a terminal device, a configuration indicating a configured grant (CG) physical uplink shared channel (PUSCH) resource and a search space which is specific to the terminal device; receiving, from the terminal device, data using the CG PUSCH resource; and transmitting, to the terminal device, a physical downlink control channel (PDCCH) on the search space using a reference signal which is quasi-collocated (QCL) with a beam which is used for transmitting the data using the CG PUSCH resource.

In a fifth aspect, there is provided a method of communication. The method comprises: transmitting, at a network device and to a terminal device, a configuration indicating a configured grant (CG) physical uplink shared channel (PUSCH) resource and a search space which is specific to the terminal device; transmitting, to the terminal device, a configuration of a timer; and during the timer being running, transmitting, to the terminal device, a physical downlink control channel (PDCCH) on the search space for a dynamic retransmission indication of the CG PUSCH.

In a sixth aspect, there is provided a method of communication. The method comprises: transmitting, at a network device and to a terminal device, a number of preambles for data transmission in a radio resource control (RRC) inactive state; transmitting an offset to the terminal device; and receiving the data transmission using a start index of preamble which is determined based on the offset.

In a seventh aspect, there is provided a terminal device. The terminal device comprises a processor and a memory coupled to the processor. The memory stores instructions that when executed by the processor, cause the terminal device to perform the method according to any one of the above first, second or third aspect of the present disclosure.

In an eighth aspect, there is provided a network device. The network device comprises a processor and a memory coupled to the processor. The memory stores instructions that when executed by the processor, cause the network device to perform the method according to any one of the above fourth, fifth or sixth aspect of the present disclosure.

In a ninth aspect, there is provided a computer readable medium having instructions stored thereon. The instructions, when executed on at least one processor, cause the at least one processor to perform the method according to the first aspect, or second, or third of the present disclosure.

In a tenth aspect, there is provided a computer readable medium having instructions stored thereon. The instructions, when executed on at least one processor, cause the at least one processor to perform the method according to the fourth aspect, or fifth, or sixth of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
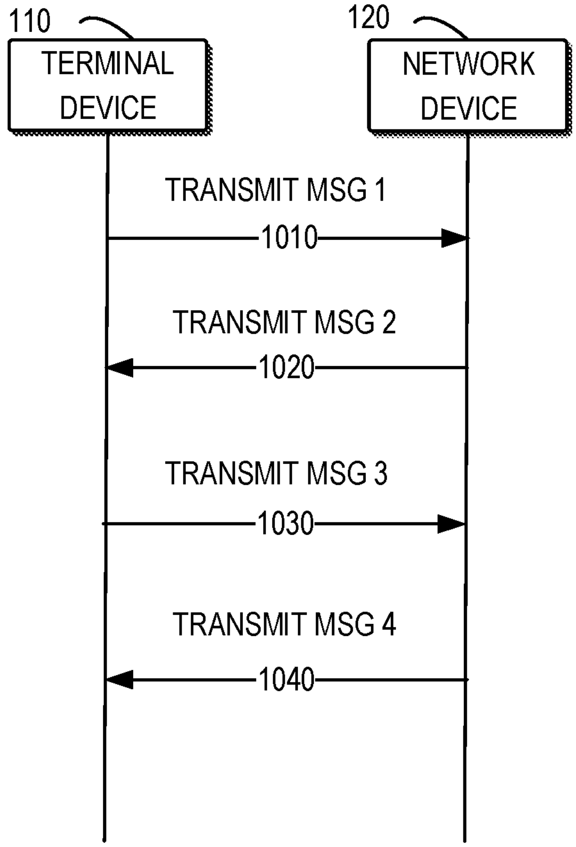
FIGS. 1A-IC illustrate schematic diagram of random access procedure according to conventional technologies, respectively.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As mentioned above, the configured grant (CG) based uplink transmission has been proposed. The term "configured grant (CG)" refer to grant-free resource in uplink, which means that the pre-configured UE-specific resources will be used for UE UL transmission without dynamic scheduling/grant. According to some technologies, small data transmission (SDT) can be supported. In New Radio (NR) Release-15 (Rel-15), only one configured grant (CG) can be configured per bandwidth part (BWP). The terminal device can perform the SDT using the CG PUSCH resource in its radio resource control (RRC) inactive state. Unlike UE RRC CONNECT state where network has knowledge of UE's channel/beam and configures a proper quasi co-located (QCL) relationship/transmission code index (TCI) state for UE's transmission and reception, network does not have information about RRC INACTIVE UE and hence cannot configure corresponding QCL relationship/TCI state to UE. According to conventional technologies, two reference signals can have a QCL relationship. For example, two antenna ports are said to be quasi co-located if properties of the channel over which a symbol on one antenna port is conveyed can be inferred from the channel over which a symbol on the other antenna port is conveyed.

FIG. 1A shows a schematic diagram of interactions for 4-step random access channel (RACH) based SDT. As shown in FIG. 1A, a terminal device 110 can transmit 1010 a message 1 (MSG 1) to a network device 120 when the terminal device 110 is in a radio resource control (RRC) inactive state. The MSG 1 comprises a preamble for the RACH. The network device 120 can transmit 1020 a message 2 (MSG 2) to the terminal device 110. The MSG 2 comprises a random access response. The terminal device 110 can transmit 1030 a message 3 (MSG 3) to the network device 120. The MSG 3 comprises a RRC connection resume request. A small payload (i.e., the small data) can be transmitted in the MSG 3. For example, the small payload can be multiplexed with the RRC connection resume request. The network device 120 can transmit 1040 a RRC release message.

Figure 1B:
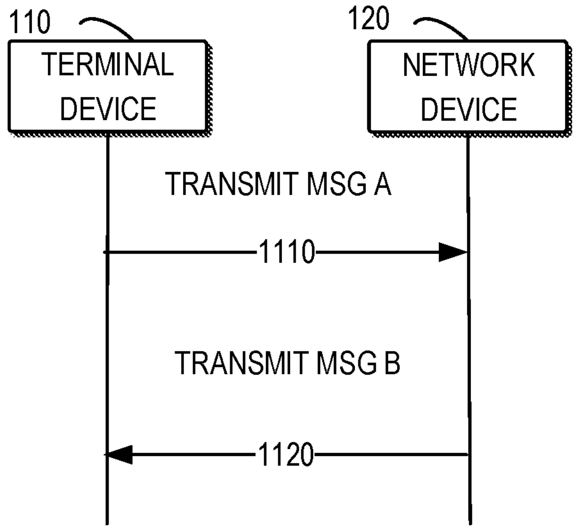

FIG. 1B shows a schematic diagram of interactions for 2-step RACH based SDT. As shown in FIG. 1B, when the terminal device 110 is in the RRC inactive state, the terminal device 110 transmits 1110 a message A (MSG A) to the network device 120. The MSG A can comprise a preamble for the RACH. The small data can be transmitted with the MSG A. In particular, the small data can be transmitted on physical uplink shared channel (PUSCH) resources that are pre-configured by the network device 120 and are broadcasted in system information with associated physical transmission parameters. The network device 120 transmits 1120 a message B (MSG B) to the terminal device 110. The MSG B comprises a random access response.

Figure 1C:
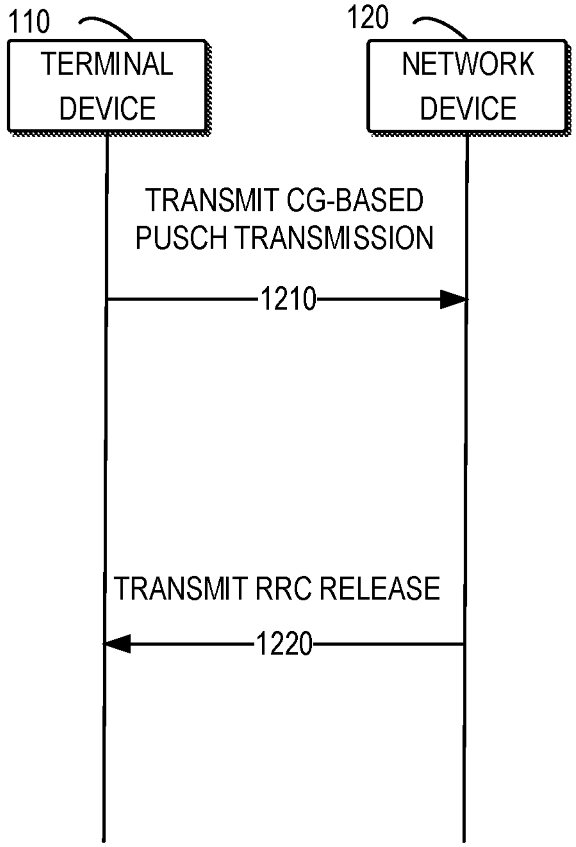

FIG. 1C shows a schematic diagram of interactions for Configured Grant based SDT. When the terminal device 110 is in a RRC Connected state, the terminal device 110 can receive 1210 a CG type1 configuration that indicates specific pre-configured PUSCH resources to be used for UL data transmission in RRC Inactive as long as the timing alignment is valid. The network device 120 can transmit 1220 a RRC release message.

In wireless systems, it is required to adjust a timing of an uplink frame in order to have alignment with a downlink frame in time domain. According to some conventional technologies, timing advance (TA) value corresponds to the length of time a signal takes to reach the network device from the terminal device. The timing advance adjustment can take place both during the RACH procedure (for example, via the Timing Advance Command) and during a normal operation of the terminal device in RRC Connected state. The term "timing advance command (TAC)" used herein can refer to a command sent by a network device to a terminal device to adjust its uplink transmission means that the terminal device sends UL symbols in advance according to command for i.e. PUSCH, physical uplink control channel (PUCCH) and sounding reference signal (SRS) transmission. The TAC can inform the terminal device the amount of time that the terminal device needs to advance the UL transmissions.

In order to solve at least part of above problems, solutions on PDCCH monitoring are needed. According to embodiments of the present disclosure, a terminal device receives from a network device, a configuration indicating a configured grant (CG) physical uplink shared channel (PUSCH) resource and a search space which is specific to the terminal device. The terminal device transmits, to the network device, data using the CG PUSCH resource. The terminal device monitors a physical downlink control channel (PDCCH) on the search space using a reference signal which is quasi-collocated (QCL) with a beam on which the data is transmitted using the CG PUSCH resource. In this way, it can achieve better link performances.

Figure 2:
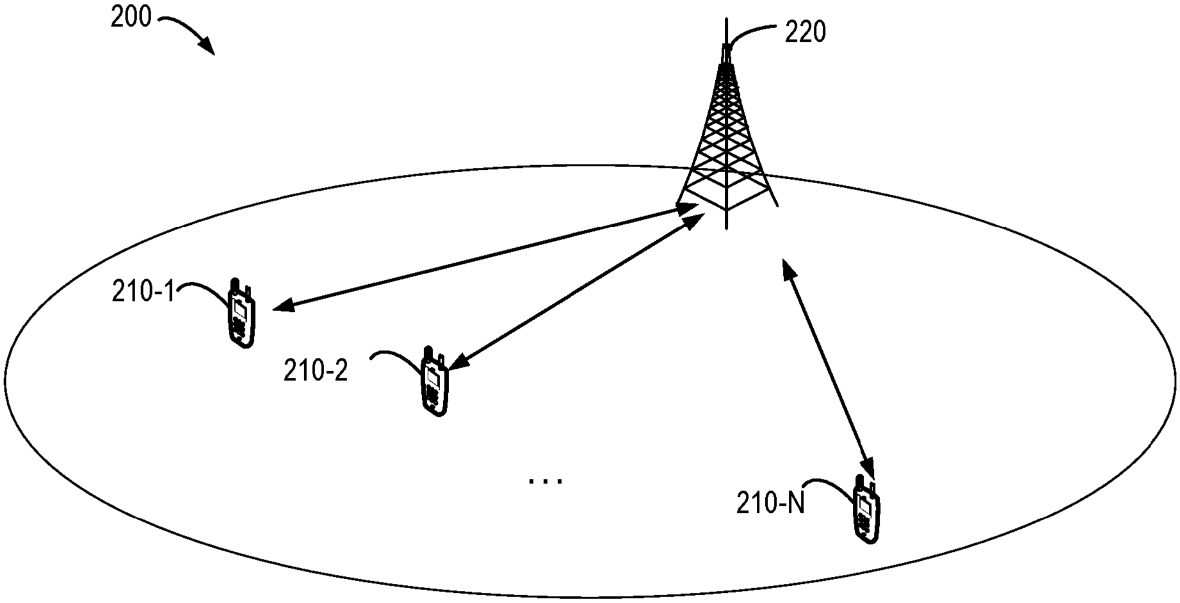
FIG. 2 is a schematic diagram of a communication environment in which embodiments of the present disclosure can be implemented.

FIG. 2 illustrates a schematic diagram of a communication system in which embodiments of the present disclosure can be implemented. The communication system 200, which is a part of a communication network, comprises a terminal device 210-1, a terminal device 210-2, . . . , a terminal device 210-N, which can be collectively referred to as "terminal device(s) 210." The number N can be any suitable integer number.

The communication system 200 further comprises a network terminal device 220. In some embodiments, the network device may be gNB. In the communication system 200, the network devices 220 and the terminal devices 210 can communicate data and control information to each other. The numbers of terminal devices and network devices shown in FIG. 2 are given for the purpose of illustration without suggesting any limitations.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Embodiments of the present disclosure can be applied to any suitable scenarios. For example, embodiments of the present disclosure can be implemented at reduced capability NR devices. Alternatively, embodiments of the present disclosure can be implemented in one of the followings: NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Figure 3:
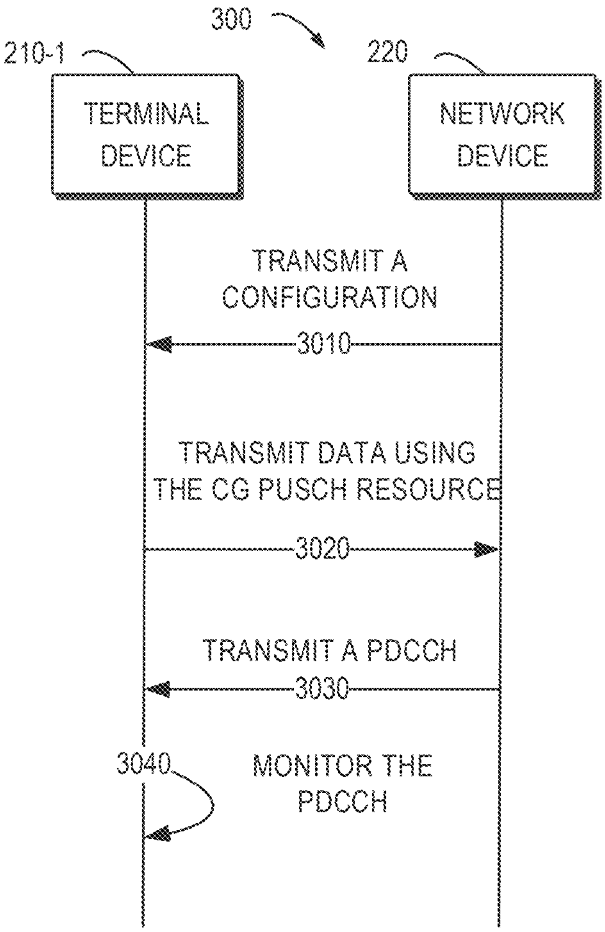
FIG. 3 illustrates a schematic diagram illustrating a process for monitoring PDCCH according to embodiments of the present disclosure.

Embodiments of the present disclosure will be described in detail below. Reference is first made to FIG. 3, which shows a signaling chart illustrating process 300 among network devices according to some example embodiments of the present disclosure. Only for the purpose of discussion, the process 300 will be described with reference to FIG. 2. The process 300 may involve the terminal device 210-1 and the network device 220 in FIG. 2.

The network device 220 transmits 3010 a configuration which indicates a configured grant (CG) physical uplink shared channel (PUSCH) resource to the terminal device 210-1. The term "PUSCH resource" can refer to a transmission occasion and a demodulation reference signal (DMRS) resource used for PUSCH transmission. The configuration also indicates a search space which is specific to the terminal device 210-1. The UE-specific search space can carry control information specific to a particular UE and is monitored by at least one UE in a cell. Unlike the common space search, the starting location of the UE-specific search space may be varied for each subframe or UE. The starting location of the UE-specific search space is determined in every subframe using a hash function. In the UE-specific search space the UE finds its PDCCH by monitoring a set of PDCCH candidates in every subframe.

The terminal device 210-1 transmits 3020 data using the CG PUSCH resource to the network device 220. The terminal device 210-1 is in an inactive state. For example, the terminal device 210-1 can transmit user plane data on the CG PUSCH resource during the RRC inactive state.

The network device 220 transmits 3030 a physical downlink control channel (PDCCH) to the terminal device 210-1. The terminal device 210-1 monitors 3040 the PDCCH on the search space using a reference signal. The reference signal is QCL with a beam which is used for transmitting the data using the CG PUSCH resource in the activate state. In this way, it can achieve better link performances.

In some embodiments, the terminal device 210-1 can monitor the PDCCH on the search space using the reference signal which is QCL with a synchronization signal physical broadcast channel (SSB) which is used for transmitting the data. Alternatively or in addition, the terminal device 210-1 can monitor the PDCCH on the search space using the reference signal which is QCL with channel state information (CSI) which is used for transmitting the data.

For example, the terminal device 210-1 may monitor on every PDCCH occasions using QCL with SSB and/or CSI (beam) which is latest used to transmit CG PUSCH resource. In other words, the latest used to transmit CG PUSCH resource means the selected SSB and/or CSI to determine PUSCH resources and/or transmitted PUSCH special filter during CG PUSCH SDT preparation phase.

Alternatively or in addition, the k-th PDCCH monitoring occasion can be QCL with the k-th SSB and/or CSI (beam). In some embodiments, the k-th beam can be the k-th transmitted SSB indicated by RRC signaling. Alternatively, the k-th beam can be the k-th SSB and/or CSI used for TA validation. In other embodiments, the k-th beam can be the k-th SSB configured for CG PUSCH transmission. In some embodiments, the 1-st PDCCH monitoring occasion can start from slot #m which is configured by higher layers.

In some embodiments, the QCL relationship can be QCL type D, which is the same spacial filter. The terminal device 210-1 may measure a set of reference signal received powers (RSRPs) on a set of beams. In this case, the terminal device 210-1 may select a CG PUSCH QCL relation based on the set of RSRPs. In some embodiments, the terminal device 210-1 may a timing alignment based on the set of RSRPs. The terminal device 210-1 may determine the CG PUSCH for small data transmission by validating the timing alignment.

Figure 4:
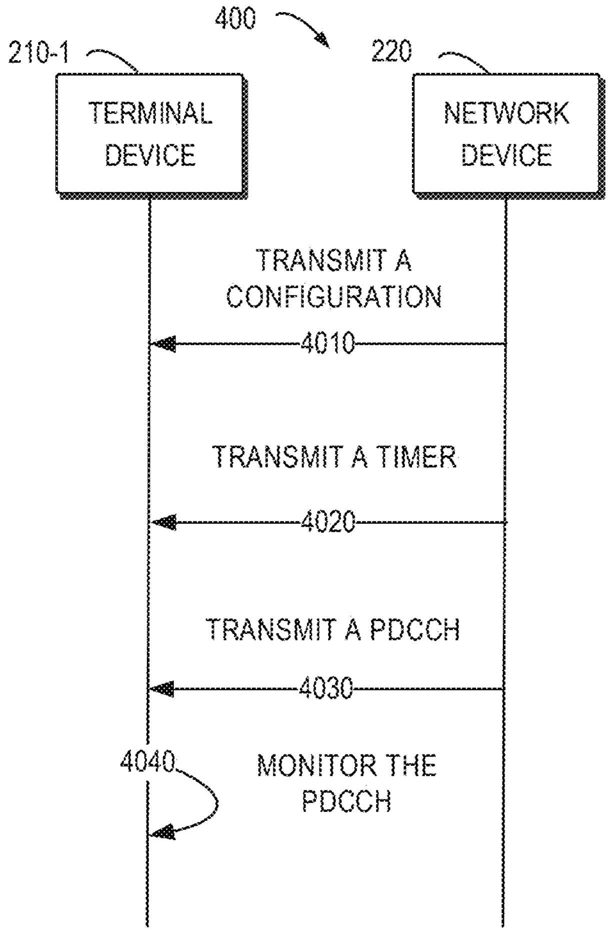
FIG. 4 illustrates a schematic diagram illustrating a process for monitoring PDCCH according to embodiments of the present disclosure.

FIG. 4 shows a signaling chart illustrating process 400 among network devices according to some example embodiments of the present disclosure. Only for the purpose of discussion, the process 400 will be described with reference to FIG. 2. The process 400 may involve the terminal device 210-1 and the network device 220 in FIG. 2.

The network device 220 transmits 4010 a configuration which indicates a CG PUSCH resource to the terminal device 210-1. The configuration also indicates a search space which is specific to the terminal device 210-1.

The network device 220 transmits 4020 a configuration of a timer. The network device 220 can configure any suitable value of the timer.

The network device 220 transmits 4030 a physical downlink control channel (PDCCH) to the terminal device 210-1. The terminal device 210-1 monitors 4040 the PDCCH on the search space using a reference signal. The reference signal is QCL with a beam on which the data is transmitted using the CG PUSCH resource. In this case, when the timer is running, the terminal device 210-1 can monitor the PDCCH on USS for dynamic retransmission indication of CG PUSCH. In other embodiments, if the timer is not running or the timer expires, the terminal device 210-1 may not monitor PDCCH on USS. In some embodiments, if the terminal device 210-1 transmits CG PUSCH in a RRC inactive state for SDT, the terminal device 210-1 may start or restart the timer.

Similarly, in some embodiments, the terminal device 210-1 can monitor the PDCCH on the search space using the reference signal which is QCL with a synchronization signal physical broadcast channel (SSB) which is used for transmitting the data. Alternatively or in addition, the terminal device 210-1 can monitor the PDCCH on the search space using the reference signal which is QCL with channel state information (CSI) which is used for transmitting the data.

For example, the terminal device 210-1 may monitor on every PDCCH occasions using QCL with SSB and/or CSI (beam) which is latest used to transmit CG PUSCH resource. In other words, the latest used to transmit CG PUSCH resource means the selected SSB and/or CSI to determine PUSCH resources and/or transmitted PUSCH special filter during CG PUSCH SDT preparation phase.

Alternatively or in addition, the k-th PDCCH monitoring occasion can be QCL with the k-th SSB and/or CSI (beam). In some embodiments, the k-th beam can be the k-th transmitted SSB indicated by RRC signaling. Alternatively, the k-th beam can be the k-th SSB and/or CSI used for TA validation. In other embodiments, the k-th beam can be the k-th SSB configured for CG PUSCH transmission. In some embodiments, the 1-st PDCCH monitoring occasion can start from slot #m which is configured by higher layers.

Figure 5:
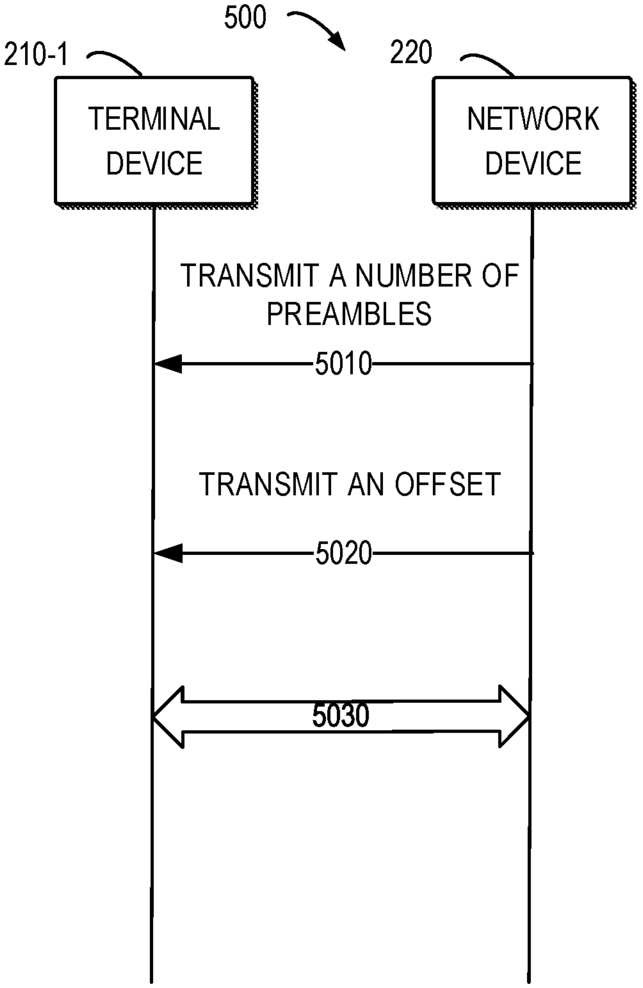
FIG. 5 illustrates a schematic diagram illustrating a process for monitoring PDCCH according to embodiments of the present disclosure.

FIG. 5 shows a signaling chart illustrating process 500 among network devices according to some example embodiments of the present disclosure. Only for the purpose of discussion, the process 500 will be described with reference to FIG. 2. The process 500 may involve the terminal device 210-1 and the network device 220 in FIG. 2.

The network device 220 transmits 5010 a number of preambles for data transmission in a RRC inactive state to the terminal device 210-1. In some embodiments, the preambles can be common contention based random access channel (RACH) preamble for UE requesting data transmission during RRC INACTIVE state.

The network device 220 transmits 5020 an offset to the terminal device 210-1. The offset can be any suitable number. For example, the offset can be any number from 1 to 64. The offset can be transmitted via any suitable signaling. For example, the offset can be transmitted in RRC signaling.

The terminal device 210-1 performs 5030 the data transmission using the start index. The terminal device 210-1 may determine a start index of preamble based on the offset. In some embodiments, the start index of preamble for the terminal device 210-1 requesting data transmission during RRC INACTIVE state can be the offset.

Alternatively or in addition, the start index of preamble for the terminal device 210-1 requesting data transmission during RRC INACTIVE state can be R+offset. In this case, R can number of Type-1 contention based RACH for 4 step RACH. The offset can a number configured by network, when shared RACH occasion between Type-1 contention based RACH for 4 step RACH and common contention based RACH preamble for UE requesting data transmission during RRC INACTIVE state. In this way, introducing an offset value to indicate the start index of preamble can give flexibility to configure different portion of preamble in shared RACH occasion and the terminal device needs not to understand the function of each part of RACH preamble before offset.

Figure 6:
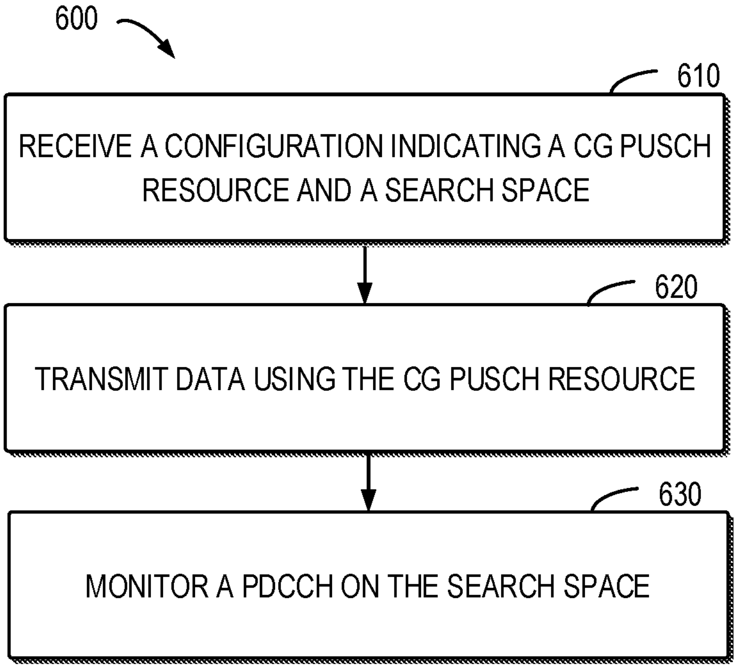
FIG. 6 illustrates a flow chart of an example method of communication implemented at a terminal device in accordance with some embodiments of the present disclosure.

FIG. 6 shows a flowchart of an example method 600 in accordance with an embodiment of the present disclosure. Only for the purpose of illustrations, the method 600 can be implemented at a terminal device 210-1 as shown in FIG. 2.

At block 610, the terminal device 210-1 receives, from the network device 220, a configuration indicating a configured grant (CG) physical uplink shared channel (PUSCH) resource and a search space which is specific to the terminal device.

At block 620, the terminal device 210-1 transmits, to the network device 220, data using the CG PUSCH resource. The terminal device 210-1 is in an inactive state. Only as an example, the terminal device 210-1 can be in the RRC inactive state.

At block 630, the terminal device 210-1 monitors a physical downlink control channel (PDCCH) on the search space using a reference signal which is quasi-collocated (QCL) with a beam which is sued for transmitting the data using the CG PUSCH resource in the inactive state. In some embodiments, the terminal device 210-1 can monitor the PDCCH on the search space using the reference signal which is QCL with a synchronization signal physical broadcast channel block (SSB) which is used for transmitting the data. Alternatively or in addition, the terminal device 210-1 can monitor the PDCCH on the search space using the reference signal which is QCL with channel state information which is used for transmitting the data.

In some embodiments, the SSB is latest used for transmitting the data, and the channel state information is latest used for transmitting the data. Alternatively, the k-th PDCCH monitoring occasion is QCL with at least one of: the SSB or the channel state information.

In other embodiments, the terminal device 210-1 can measure a set of RSRPs on a set of beams. In this situation, the terminal device 210-1 can select a CG PUSCH QCL relation based on the set of RSRPs. The terminal device 210-1 can determine a timing alignment based on the set of RSRPs. The terminal device 210-1 may also determine the CG PUSCH for small data transmission based on the timing alignment.

Figure 7:
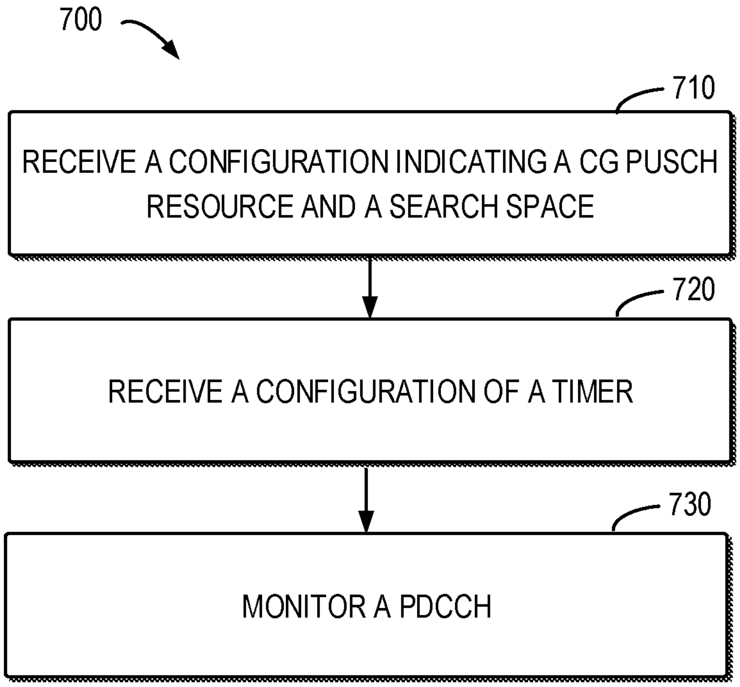
FIG. 7 illustrates a flow chart of an example method of communication implemented at a terminal device in accordance with some embodiments of the present disclosure.

FIG. 7 shows a flowchart of an example method 700 in accordance with an embodiment of the present disclosure. Only for the purpose of illustrations, the method 700 can be implemented at a terminal device 210-1 as shown in FIG. 2.

At block 710, the terminal device 210-1 receives, from the network device 220, a configuration indicating a CG PUSCH resource and a search space which is specific to the terminal device 210-1. At block 720, the terminal device 210-1 receives, from the network device 220, a configuration of a timer.

At block 730, during the timer being running, the terminal device 210-1 monitors a PDCCH on the search space for a dynamic retransmission indication of the CG PUSCH. In some embodiments, if the timer expires, the terminal device 210-1 may not monitor the PDCCH on the search space. Alternatively, if small data transmission is transmitted using the CG PUSCH resource, the terminal device 210-1 may start or restart the timer.

Figure 8:
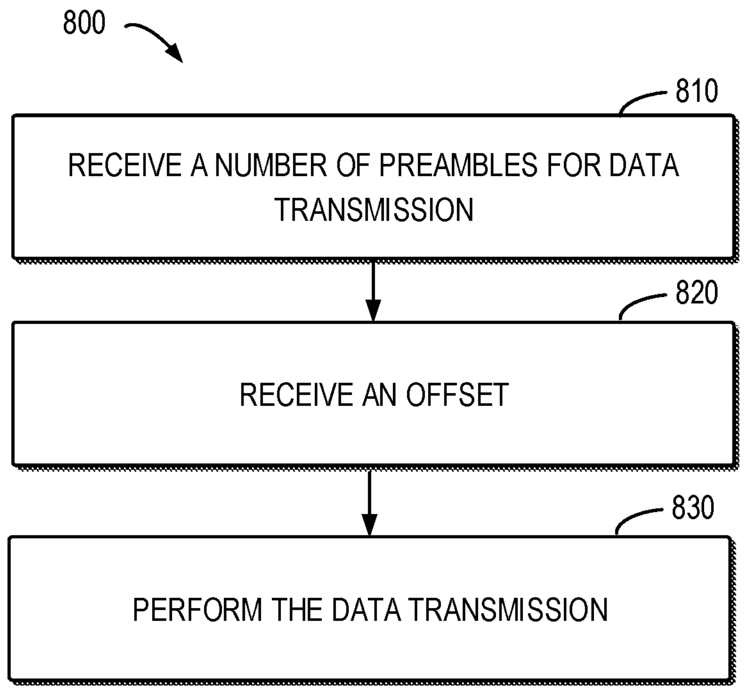
FIG. 8 illustrates a flow chart of an example method of communication implemented at a terminal device in accordance with some embodiments of the present disclosure.

FIG. 8 shows a flowchart of an example method 800 in accordance with an embodiment of the present disclosure. Only for the purpose of illustrations, the method 800 can be implemented at a terminal device 210-1 as shown in FIG. 2.

At block 810, the terminal device 210-1 receives, from the network device 220, a number of preambles for data transmission in a radio resource control (RRC) inactive state.

At block 820, the terminal device 210-1 receives an offset from the network device 220. At block 830, the terminal device 210-1 performs the data transmission using a start index of preamble which is determined based on the offset. In some embodiments, the start index of preamble can be the offset. Alternatively or in addition, the start index of preamble can be determined based on the offset and the number of type-1 contention based random access channel.

Figure 9:
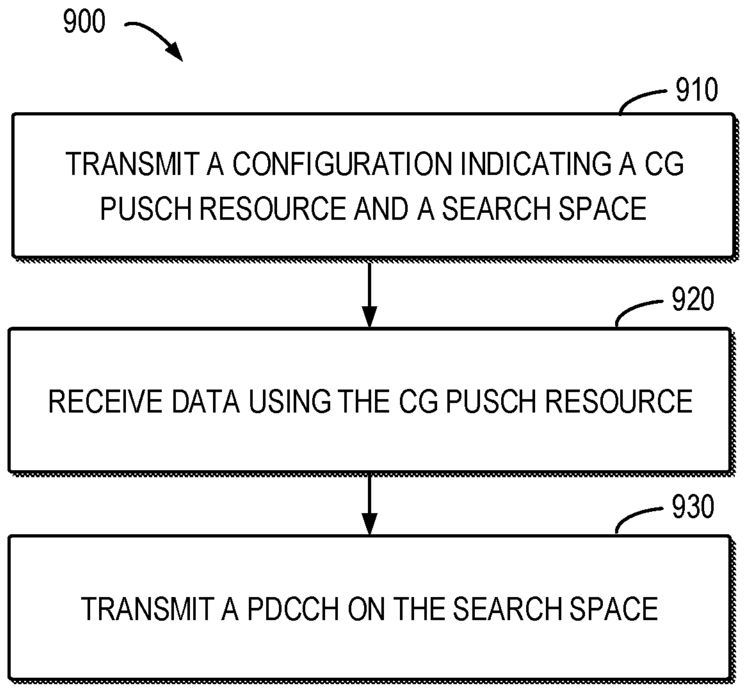
FIG. 9 illustrates a flow chart of an example method of communication implemented at a network device in accordance with some embodiments of the present disclosure.

FIG. 9 shows a flowchart of an example method 900 in accordance with an embodiment of the present disclosure. Only for the purpose of illustrations, the method 900 can be implemented at a network device 220 as shown in FIG. 2.

At block 910, the network device 220 transmits, to the terminal device 210-1, a configuration indicating a configured grant (CG) physical uplink shared channel (PUSCH) resource and a search space which is specific to the terminal device.

At block 920, the network device 220 receives, from the terminal device 210-1, data using the CG PUSCH resource.

At block 930, the network device 220 transmits, to the terminal device 210-1, a physical downlink control channel (PDCCH) on the search space using a reference signal which is quasi-collocated (QCL) with a beam which is used for transmitting the data using the CG PUSCH resource. In some embodiments, the network device 220 can transmit the PDCCH on the search space using the reference signal which is QCL with a synchronization signal physical broadcast channel block (SSB) which is used for transmitting the data. Alternatively or in addition, the network device 220 can transmit the PDCCH on the search space using the reference signal which is QCL with channel state information which is used for transmitting the data.

In some embodiments, the SSB is latest used for transmitting the data, and the channel state information is latest used for transmitting the data. In other embodiments, a k-th PDCCH monitoring occasion is QCL with at least one of: the SSB or the channel state information.

Figure 10:
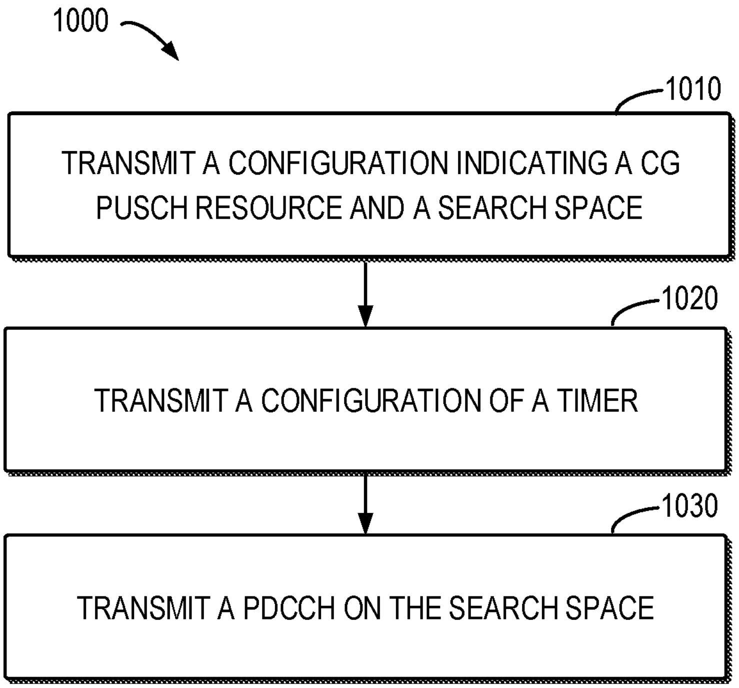
FIG. 10 illustrates a flow chart of an example method of communication implemented at a network device in accordance with some embodiments of the present disclosure.

FIG. 10 shows a flowchart of an example method 1000 in accordance with an embodiment of the present disclosure. Only for the purpose of illustrations, the method 1000 can be implemented at a network device 220 as shown in FIG. 2.

At block 1010, the network device 220 transmits, to the terminal device 210-1, a configuration indicating a configured grant (CG) physical uplink shared channel (PUSCH) resource and a search space which is specific to the terminal device.

At block 1020, the network device 220 transmits, to the terminal device 210-1, a configuration of a timer.

At block 1030, during the timer being running, the network device 220 transmits, to the terminal device 210-1, a physical downlink control channel (PDCCH) on the search space for a dynamic retransmission indication of the CG PUSCH.

Figure 11:
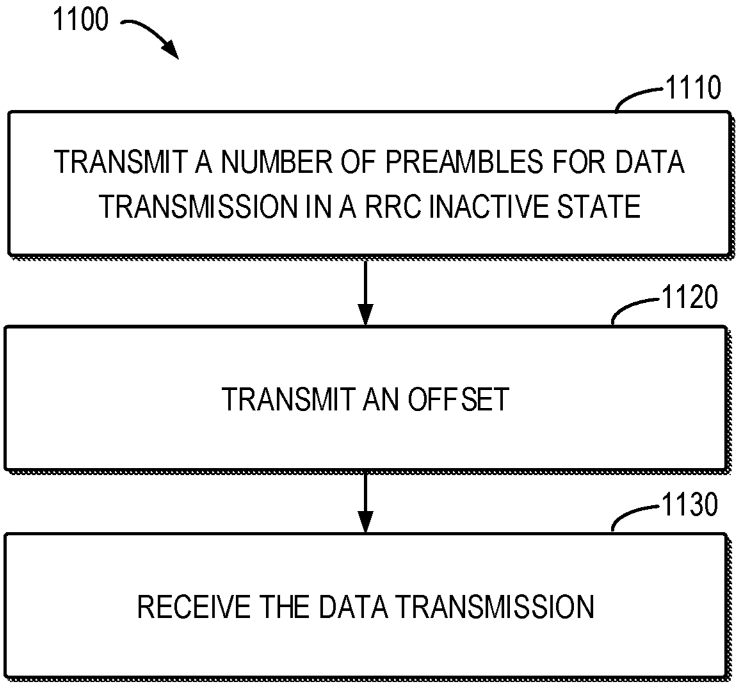
FIG. 11 illustrates a flow chart of an example method of communication implemented at a network device in accordance with some embodiments of the present disclosure.

FIG. 11 shows a flowchart of an example method 1100 in accordance with an embodiment of the present disclosure. Only for the purpose of illustrations, the method 1100 can be implemented at a network device 220 as shown in FIG. 2.

At block 1110, the network device 220 transmits, to the terminal device 210-1, a number of preambles for data transmission in a radio resource control (RRC) inactive state.

At block 1120, the network device 220 transmits an offset to the terminal device 210-1. At block 1130, the network device 220 receives the data transmission using a start index of preamble which is determined based on the offset. In some embodiments, the start index of preamble is the offset. Alternatively or in addition, the start index of preamble can be determined based on the offset and the number of type-1 contention based random access channel.

In some embodiments, a terminal device comprises circuitry configured to receive, from a network device, a configuration indicating a configured grant (CG) physical uplink shared channel (PUSCH) resource and a search space which is specific to the terminal device; transmit, to the network device, data using the CG PUSCH resource in an inactive state; and monitor, at the terminal device, a physical downlink control channel (PDCCH) on the search space using a reference signal which is quasi-collocated (QCL) with a beam which is used for transmitting the data using the CG PUSCH resource in the inactive state.

In some embodiments, the terminal device comprises circuitry configured to monitor the PDCCH on the search space by at least one of: monitoring the PDCCH on the search space using the reference signal which is QCL with a synchronization signal physical broadcast channel block (SSB) which is used for transmitting the data; or monitoring the PDCCH on the search space using the reference signal which is QCL with channel state information which is used for transmitting the data.

In some embodiments, the SSB is latest used for transmitting the data, and the channel state information is latest used for transmitting the data.

In some embodiments, a k-th PDCCH monitoring occasion is QCL with at least one of: the SSB or the channel state information.

In some embodiments, the terminal device comprises circuitry configured to measure a set of reference signal received powers (RSRPs) on a set of beams; and select a CG PUSCH QCL relation based on the set of RSRPs.

In some embodiments, the terminal device comprises circuitry configured to determine a timing alignment based on the set of RSRPs; and determine the CG PUSCH for small data transmission based on the timing alignment.

In some embodiments, a terminal device comprises circuitry configured to receive, from a network device, a configuration indicating a configured grant (CG) physical uplink shared channel (PUSCH) resource and a search space which is specific to the terminal device; receive, from the network device, a configuration of a timer; and during the timer being running, monitor a physical downlink control channel (PDCCH) on the search space for a dynamic retransmission indication of the CG PUSCH.

In some embodiments, the terminal device comprises circuitry configured to in accordance with a determination that the timer expires, cause monitoring the PDCCH on the search space to be skipped.

In some embodiments, the terminal device comprises circuitry configured to in accordance with a determination that small data transmission is transmitted using the CG PUSCH resource, restart the timer.

In some embodiments, a terminal device comprises circuitry configured to receive, from a network device, a number of preambles for data transmission in a radio resource control (RRC) inactive state; receive an offset from the network device; and perform the data transmission using a start index of preamble which is determined based on the offset.

In some embodiments, the start index of preamble is the offset.

In some embodiments, the start index of preamble is determined based on the offset and the number of type-1 contention based random access channel.

In some embodiments, a network device comprises circuitry configured to transmit, to a terminal device, a configuration indicating a configured grant (CG) physical uplink shared channel (PUSCH) resource and a search space which is specific to the terminal device; receive, from the terminal device, data using the CG PUSCH resource; and transmit, to the terminal device, a physical downlink control channel (PDCCH) on the search space using a reference signal which is quasi-collocated (QCL) with a beam which is used for transmitting the data using the CG PUSCH resource.

In some embodiments, the network device comprises circuitry configured to transmit the PDCCH on the search space by at least one of: transmitting the PDCCH on the search space using the reference signal which is QCL with a synchronization signal physical broadcast channel block (SSB) which is used for transmitting the data; or transmitting the PDCCH on the search space using the reference signal which is QCL with channel state information which is used for transmitting the data.

In some embodiments, the SSB is latest used for transmitting the data, and the channel state information is latest used for transmitting the data.

In some embodiments, a k-th PDCCH monitoring occasion is QCL with at least one of: the SSB or the channel state information.

In some embodiments, a network device comprises circuitry configured to transmit, to a terminal device, at a network device and to a terminal device, a configuration indicating a configured grant (CG) physical uplink shared channel (PUSCH) resource and a search space which is specific to the terminal device; transmit, to the terminal device, a configuration of a timer; and during the timer being running, transmit, to the terminal device, a physical downlink control channel (PDCCH) on the search space for a dynamic retransmission indication of the CG PUSCH.

In some embodiments, a network device comprises circuitry configured to transmit, to a terminal device, a number of preambles for data transmission in a radio resource control (RRC) inactive state; transmit an offset to the terminal device; and receive the data transmission using a start index of preamble which is determined based on the offset.

In some embodiments, the start index of preamble is the offset.

In some embodiments, the start index of preamble is determined based on the offset and the number of type-1 contention based random access channel.

Figure 12:
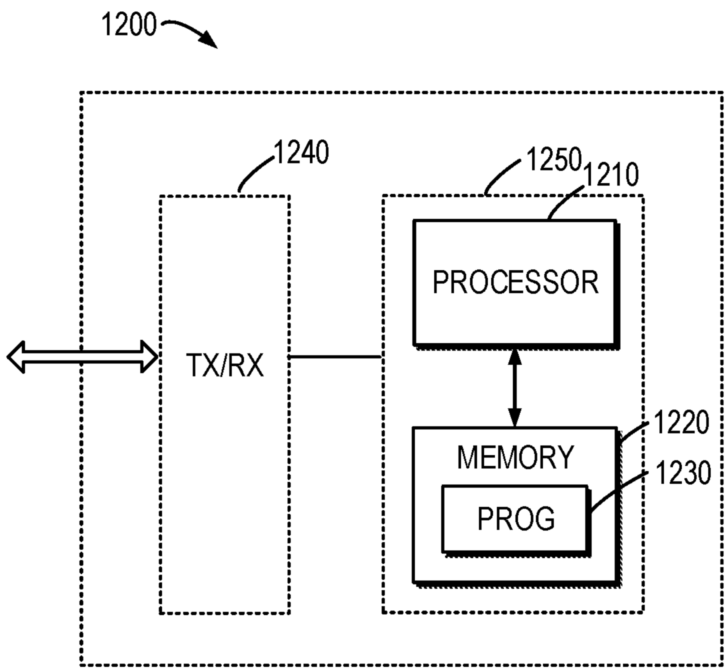
FIG. 12 is a simplified block diagram of a device that is suitable for implementing embodiments of the present disclosure.

FIG. 12 is a simplified block diagram of a device 1200 that is suitable for implementing embodiments of the present disclosure. The device 1200 can be considered as a further example implementation of the network device 220 or the terminal device 210 as shown in FIG. 2. Accordingly, the device 1200 can be implemented at or as at least a part of the terminal device 210 or the network device 220.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1210 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the embodiments of the present disclosure, as discussed herein with reference to FIGS. 2-5. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1220 may form processing means adapted to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:

receiving configuration information for a configured grant for a physical uplink shared channel (PUSCH) transmission in an inactive state and configuration information for a search space;

transmitting the PUSCH transmission in the inactive state, by using a configured grant resource configured by the configuration information for the configured grant for the PUSCH transmission in the inactive state; and monitoring a physical downlink control channel (PDCCH) on the search space based on a reference signal, wherein the reference signal is quasi co-located with a synchronization signal block (SSB) associated with the PUSCH transmission.

2. The method of claim 1, further comprising:

considering timing alignment (TA) validation for the PUSCH transmission based on reference signal received powers (RSRPs).

3. A terminal device, comprising a processor configured to:

receive configuration information for configured grant for a physical uplink shared channel (PUSCH) transmission in an inactive state and configuration information for a search space;

transmit the PUSCH transmission in the inactive state, by using a configured grant resource configured by the configuration information for the configured grant for the PUSCH transmission in an inactive state; and monitor a physical downlink control channel (PDCCH) on the search space based on a reference signal, wherein the reference signal is quasi co-located with a synchronization signal block (SSB) associated with the PUSCH transmission.

4. The terminal device of claim 3, wherein the processor is further configured to:

consider timing alignment (TA) validation for the PUSCH transmission based on reference signal received powers (RSRPs).

5. A method performed by a network device, the method comprising:

transmitting configuration information for configured grant for a physical uplink shared channel (PUSCH) in an inactive state and configuration information for a search space;

receiving the PUSCH transmission, by using a configured grant resource configured by the configuration information for the configured grant for the PUSCH transmission in the inactive state; and transmitting a physical downlink control channel (PDCCH) on the search space based on a reference signal, wherein the reference signal is quasi co-located with a synchronization signal block (SSB) associated with the PUSCH.

* * * * *